Aug. 23, 1938.  G. H. SMITH  2,128,174

BASKET

Filed Jan. 9, 1937

George H. Smith
INVENTOR

BY Victor J. Evans & Co.
ATTORNEYS

Patented Aug. 23, 1938

2,128,174

UNITED STATES PATENT OFFICE 2,128,174

BASKET

George H. Smith, Elmhurst, Ill.

Application January 9, 1937, Serial No. 119,866

1 Claim. (Cl. 224—36)

The invention relates to a basket construction and more especially to an extensible bicycle basket.

The primary object of the invention is the provision of a basket of this character, wherein the same is made in several sections, these slidably interfitted with each other so that the capacity of the basket can be decreased or increased according to the requirements for the carrying of articles therein, the basket being readily mountable upon a bicycle for use therewith particularly in making delivery of such articles by the rider of the bicycle, the basket being also serviceable for newspaper delivery or for school children in the carrying of books and other equipment as possessed by students.

Another object of the invention is the provision of a basket of this character, which is simple in its construction, reliable and effective in its operation, strong, durable, readily and easily mounted upon and removed from a bicycle or the like, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
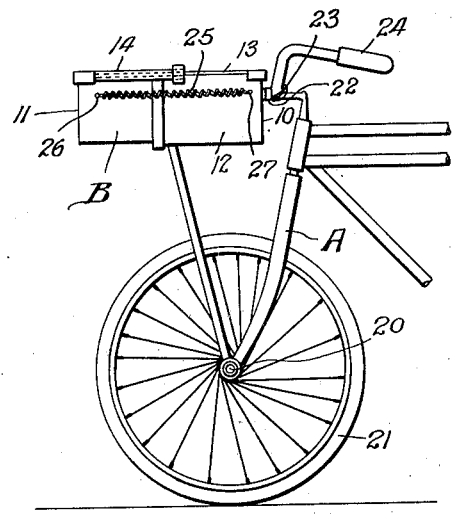
Figure 1 is a fragmentary side elevation of a bicycle showing the basket constructed in accordance with the invention mounted thereon.
Figure 2:
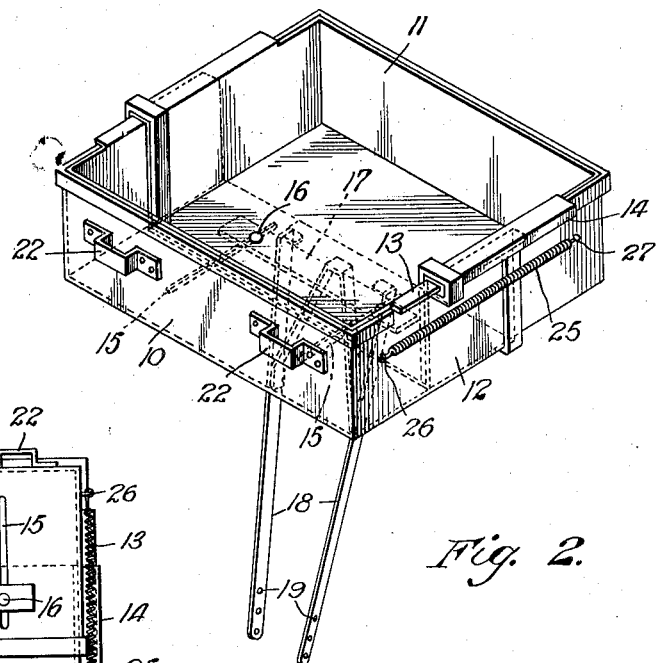
Figure 2 is a perspective view of the basket detached.
Figure 3:
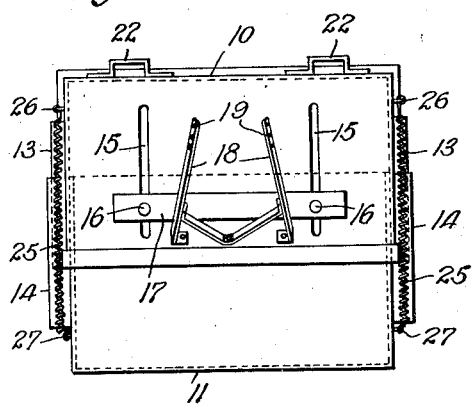
Figure 3 is a bottom plan view of the basket.

Referring to the drawing in detail, A designates generally a portion of a bicycle which is of standard kind and B the extensible basket, respectively, which latter is the subject matter of the present invention and hereinafter fully described.

This basket comprises a body formed in separable sections 10 and 11, preferably made from sheet metal and telescopically related one to the other. The body is open at its top and at the top edge of the section 10 at opposite sides 12 thereof is an out-turned flange 13 which is accommodated slidably within guides 14 bent successively outwardly, downwardly and inwardly from the top edge of the section 11 and in this manner these sections 10 and 11 are extensible for increasing the capacity of the body of the basket.

Formed in the bottom of the section 10 are spaced parallel slots 15, these being parallel with each other and receive therein fasteners 16 which are in the form of bolts passed through the bottom of the section 11 and engaged in a cross plate or strip 17 underlying the bottom of the section 10; thus in this manner the said sections 10 and 11 are slidably engaged with each other, as the fasteners 16 freely slide in the slots 15 on extending or contracting the body of the basket. This strip 17 underlies the bottom of the section 10 exteriorly of the basket.

Fixed to the bottom of the section 10 is a pair of supports 18, each having the holes 19 for the selective fitting of the axle 20 for the front wheel 21 of the bicycle A therein so that the basket may be supported horizontally and at the proper height on the bicycle.

The section 10 has the loops or yokes 22 carried thereby for accommodating straps 23 to be engaged about the handle bar 24 of the bicycle so that the basket can be detachably fastened to this handle bar.

Outside of the basket at opposite sides thereof is a pair of coiled expansion springs 25, each being fastened at 26 and 27, respectively, to the sections 10 and 11 and these springs function to contract the basket and permit expansion or extension of the said sections 10 and 11 for increasing the capacity of such basket when in use.

What is claimed is:

A basket for a bicycle having a front turning fork and handle bars comprising a sheet metal two-part body having an open top, the parts being telescopically related to each other, outturned laterally directed flanges formed at opposite sides of the parts at the open top, guides slidably accommodating the said flanges and bent successively outwardly, downwardly and inwardly from the top edge of one of the parts, one of the parts being provided with spaced parallel slots at the bottom of the body, fasteners received in said slots, a cross strip underlying the bottom of the other part and receiving said fasteners, supports adjustably connected with the fork and supporting said body, loops fixed to the body adjacent to the handle bar and engaged with the latter, and coiled springs outside of the body at opposite sides thereof and connected respectively to the parts of said body for allowing extension or contraction of these parts.

GEORGE H. SMITH.